United States Patent
Austin

(10) Patent No.: US 8,504,004 B2
(45) Date of Patent: Aug. 6, 2013

(54) AUTOMATIC CONTROL OF RATE OF NOTIFICATIONS FOR UMTS AND OTHER SIMULTANEOUS VOICE/DATA NETWORKS

(75) Inventor: Mark D. Austin, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 258 days.

(21) Appl. No.: 13/153,119

(22) Filed: Jun. 3, 2011

(65) Prior Publication Data

US 2012/0309375 A1 Dec. 6, 2012

(51) Int. Cl.
*H04M 3/00* (2006.01)
(52) U.S. Cl.
USPC ........ 455/418; 455/414.1; 455/419; 717/168; 717/171; 717/172; 717/173; 717/174; 717/176; 717/177; 717/178
(58) Field of Classification Search
USPC ............... 455/414.1, 418, 419; 717/168, 171, 717/172, 173, 174, 176, 177, 178
See application file for complete search history.

(56) References Cited

U.S. PATENT DOCUMENTS

| | | | | |
|---|---|---|---|---|
| 6,308,061 | B1 * | 10/2001 | Criss et al. | 455/418 |
| 6,687,901 | B1 * | 2/2004 | Imamatsu | 717/173 |
| 6,976,251 | B2 * | 12/2005 | Meyerson | 717/173 |
| 7,584,379 | B2 * | 9/2009 | Aoyagi et al. | 714/15 |
| 2007/0093243 | A1 * | 4/2007 | Kapadekar et al. | 455/419 |
| 2011/0009107 | A1 * | 1/2011 | Guba et al. | 455/418 |
| 2012/0124570 | A1 * | 5/2012 | Alberth et al. | 717/173 |

\* cited by examiner

*Primary Examiner* — Olumide T Ajibade Akonai
(74) *Attorney, Agent, or Firm* — Woodcock Washburn LLP

(57) ABSTRACT

A system and method for automatically controlling the rate of updates for data applications running on a mobile device. The method includes monitoring the data applications running on the mobile device, determining the data applications that receive updates to the mobile device, detecting the set-up of a voice call, and adjusting the time between updates based on the detecting step. The detecting step may include detecting an input by a user, detecting a call set-up request by the mobile device, or detecting that the mobile device is positioned near a head of a user. The determining step may include measuring the time between updates to the data application or detecting a signal from the data application indicating that updates may occur or detecting a signal from the data application indicating that automatic updates of the data application are enabled. The adjusting step may include lengthening the time between updates or suspending updates to the data application during a voice call.

20 Claims, 8 Drawing Sheets

AUTOMATIC CONTROL OF RATE OF NOTIFICATIONS FOR UMTS AND OTHER SIMULTANEOUS VOICE/DATA NETWORKS

TECHNICAL FIELD

This disclosure is related to the simultaneous instances of voice calls and data sessions, and more particularly, to the automatic control of the rate of notifications of data applications when a voice call is active.

BACKGROUND

In UMTS wireless networks, devices are able to both initiate and perform simultaneous voice and data communication sessions. Such a simultaneous session is referred to as a multi-radio access bearer (multi-RAB or mRAB) call. Any time there is a multi-RAB call in progress, the mobile device necessarily shares hardware resources between the voice call and data sessions. Such resources include power, memory, processors, physical channels, transceivers, and the like. When there is a multi-RAB call, the circuit-switched voice channel utilized in the voice call tends to be less reliable and may have a higher dropped call rate.

One of the key differences between a circuit switched call and a mRAB call are the spreading factors used across the various radio access bearer configurations. The higher rate packet switched radio access bearer typically utilizes lower spreading factors, and therefore lower processing gains. However, this same spreading factor is used across the entire physical channel, which includes the logical channels (such as the circuit switched radio access bearer and the signaling radio bearer) that are mapped onto that physical channel. The lower spreading factor correlates to a lower processing gain for the signaling radio bearer.

Moreover, during mRAB calls, there is much more signaling between the UMTS Radio Access Network (UTRAN) and user equipment (UE) across the signaling radio bearer than there may be during a circuit switched call. Frequent radio bearer reconfigurations during mRAB calls may slow updates to the control link between the base station and the UE. If the packet switched bearer is dropped during such updates, there may be an interrupted data flow. If the signaling radio bearer breaks down even momentarily, there may be dropped voice call. The stress on the signaling radio bearer may be exasperated under heavy network loads or rapidly changing signal to noise ratios.

There has been massive growth in social networking and with the proliferation of smart phones, those social networking applications have naturally migrated into the wireless communication space. Many of those applications have features that permit near-real time updates of status, preferences, and other notifications. Such updates may occur as often as every few minutes, and in a smart phone environment, may force an ongoing circuit-switched voice call into a multi-RAB session without the user ever knowing that is the case. Thus even if the user were not to initiate a data session while on a voice call, the user may nonetheless be subject to the lesser reliability associated with a multi-RAB session.

Accordingly, there is a need for a solution that enhances the reliability of a voice call in an environment in which multi-RAB calls are not only possible, but may be initiated transparently to the user.

SUMMARY

The disclosure is directed to a method for automatically controlling the rate of updates for data applications running on a mobile device, including monitoring the data applications running on the mobile device, determining the data applications that receive updates to the mobile device, detecting the set-up of a voice call, and adjusting the time between updates based on the detecting step. The detecting step may include detecting an input by a user, detecting a call set-up request by the mobile device, detecting poor quality signal or detecting that the mobile device is positioned near a head of a user. The determining step may include measuring the time between updates to the data application, detecting a signal from the data application indicating that updates may occur, or detecting a signal from the data application indicating that automatic updates of the data. The adjusting step may include lengthening the time between updates or suspending updates to the data application during a voice call. Additionally, in accordance with another embodiment, the disclosure may include an analyzing step wherein the signal quality of the communications channel is analyzed and the adjusting step is based on the analyzing step and the detecting step or the adjusting step is based on the analyzing step alone.

The disclosure is also directed to a mobile device configured for simultaneous voice and data communication sessions, including a memory for storing applications and a processor configured to monitor a data application running on the mobile device, to determine whether the data application receives updates to the mobile device, to detect the set-up of a voice call, and to adjust the time between updates based on the detect function. The applications may include a background application that operates when the data application is operational. The adjust function may include suspending the updates while a voice call is operational or lengthening the time between updates while a voice call is operational. The detect function may include detecting one of a user input, a call-set up process by the mobile device, poor signal quality, and a position of the mobile device in proximity to the head of the user.

BRIEF DESCRIPTION OF THE DRAWINGS

The following description is better understood when read in conjunction with the appended drawings, wherein.

DETAILED DESCRIPTION OF ILLUSTRATIVE EMBODIMENTS

Figure 1:
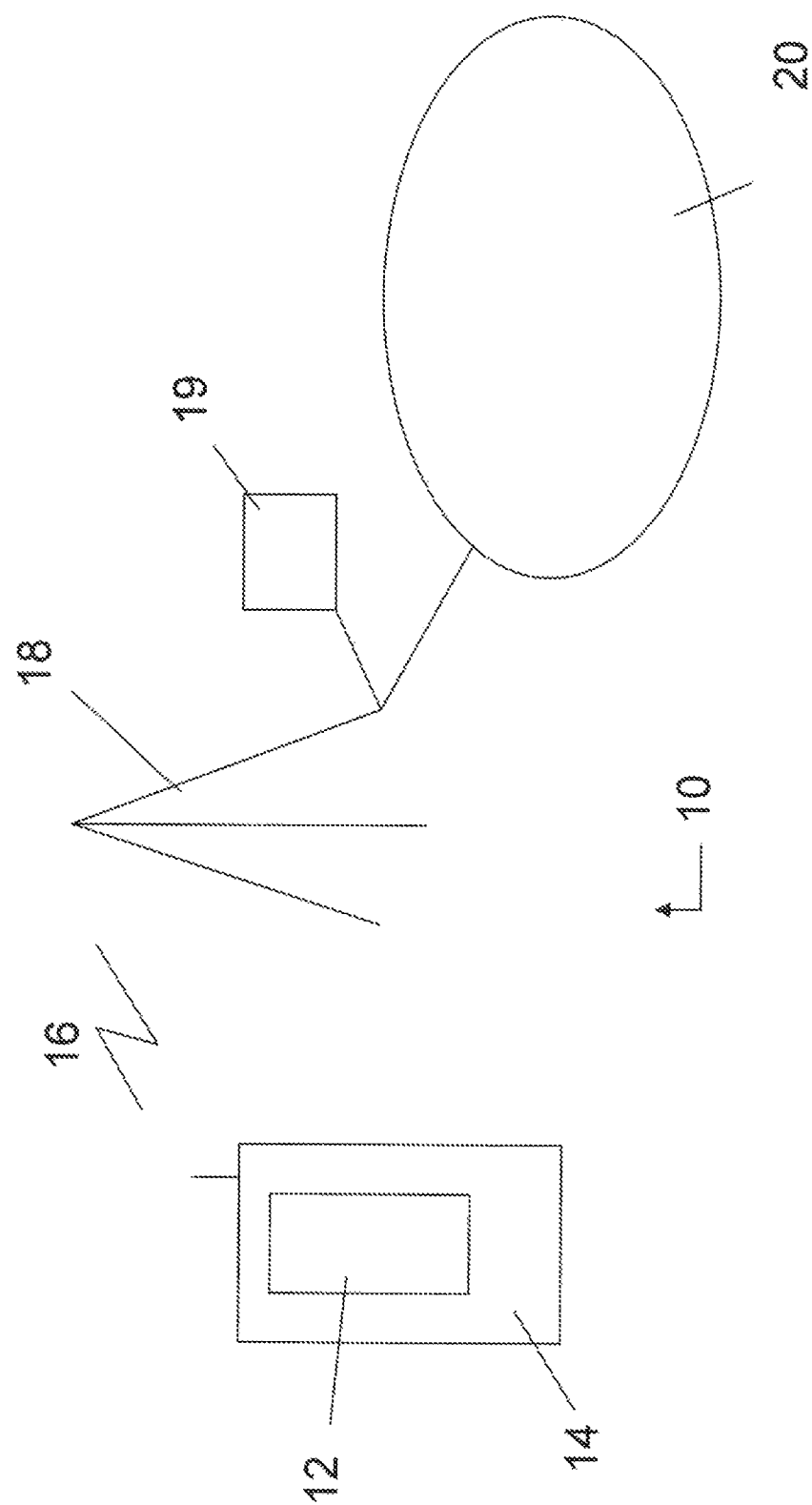
FIG. 1 is a simplified block diagram of a system configuration in which the automatic control of update rate notification may be implemented.

For the purposes of describing an exemplary embodiment of the invention, reference will be made to the figures set forth above and appended hereto. With reference to FIG. 1, there is shown an exemplary system 10 of the disclosure. There is shown a handset 14 having a display 12 thereon. It will be understood that the present disclosure may use a smart phone as an exemplary embodiment, but the present disclosure shall not be limited to a smart phone, but may be any type of user equipment that is capable of communicating with a network and may or may not include a display. The handset 14 (also referred to as a mobile device, user equipment or UE herein) communicates wirelessly over air link 16 to cellular tower 18. The cellular tower 18 is controlled by a base station controller 19 that controls communication between the cellular tower 18 and network 20. The network may include one or more application servers, illustrated as 22 in FIG. 4 and described in more detail herein. It will be understood that network may be any type of network that supports multi-RAB calling, including but not limited to GSM, CDMA, EDGE, 3G, 4G, LTE or any other wireless network and may also interface and provide access to wired networks, including the internet. Those skilled in the art will understand that the configuration of FIG. 1 is a simplified example only and that the disclosure may operate on a network that has a complete set of network elements and interfaces, such as that described in connection with FIG. 5 through FIG. 8.

In accordance with the present disclosure, to the extent that smart approaches are implemented to control and manage when data sessions are permitted to be instantiated when there is an on-going voice call, the user experience will be improved. In other words, such approaches may be utilized to prevent an existing circuit-switched voice call to be turned into a multi-RAB call. In accordance with one embodiment, the controller, shown as processing portion 92 in FIG. 3, of a handset 14 may actively control and manage the update rates associated with applications that are running on the handset 14. The controller may, for example, have a background application that communicates with the data application to control the update rates of the data application when a voice call is being set-up. Such a background application control of the data application may, for example, include a signal for the data application to suspend data updates for the duration of the call or increasing the update period beyond a threshold value—for example 5 minutes—whereby the voice call is likely to be completed before the next data update is scheduled to occur. The background application may also have a controller communicate with the data application upon the completion of the voice call in order for the data application to resume its default update rates.

Figure 2:
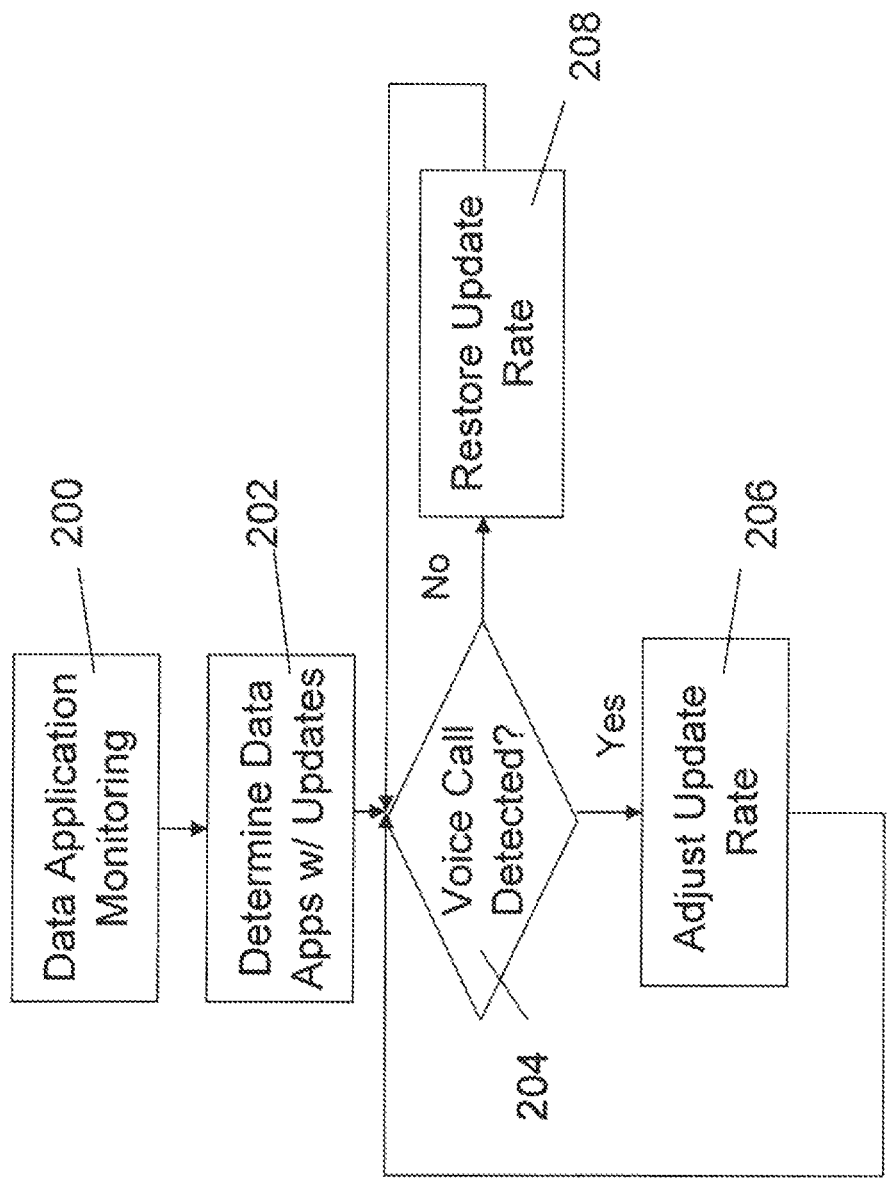
FIG. 2 is a flow chart illustrating an exemplary method of implementing the automatic control of update rate notification.

With reference to FIG. 2, there is shown a flow-chart depicting the control of the data application by the background application. The process starts at 200 wherein there is a data application running on the mobile device which is being monitored by the background application. At 202, the background application determines which data applications, if any, are subject to periodic or occasional updates without any additional input from the user. Such updates, may for example, include updates from social networks when a friend's status changes or from an interactive messaging application when a friend's presence or availability changes.

At 204, the background application detects to see if a voice call is being made. In accordance with an embodiment, the detection may occur when a user of the mobile device initiates a command such as dialing a keypad or hitting the "send" or "call" key. In accordance with another embodiment, the detection may occur when the mobile device sends out the control commands to set up a call or receives a paging command indicative of an incoming call. In yet another embodiment, the detection may occur based on the position of the mobile device in proximity to the head of the user wherein the presumption is made that if the handset is being held to the ear of the user, then a voice call must be ongoing or imminent. If a voice call is detected at 204, the update rate is adjusted at 206. The adjustment may, for example, be a suspension of all updates while the voice call is in progress. In accordance with another embodiment, the length of time between updates may be extended to reduce the likelihood of a data update occurring during the voice call. In accordance with another embodiment, the length of time between updates may be incrementally increased as the monitoring application repeated cycles through a routine to detect if a voice call is continuing. This is shown by a feedback loop to 204. If a voice call is not detected at 204 or if the voice call has ended and thus not detected at 204, then the process continues at 208 wherein the original update rates are restored.

In accordance with another embodiment, the adjustment of the automatic updates may be determined based on an analysis of the signal quality of the radio channel. In a poor signal quality environment, the period between automatic updates may be lengthened or the automatic updates may be suspended. In a good signal quality environment, the automatic updates may be restored back to default levels. The signal quality of the radio channel may be used independent of the detection of a voice channel or may be used in conjunction with the detection of a voice channel.

Figure 3:
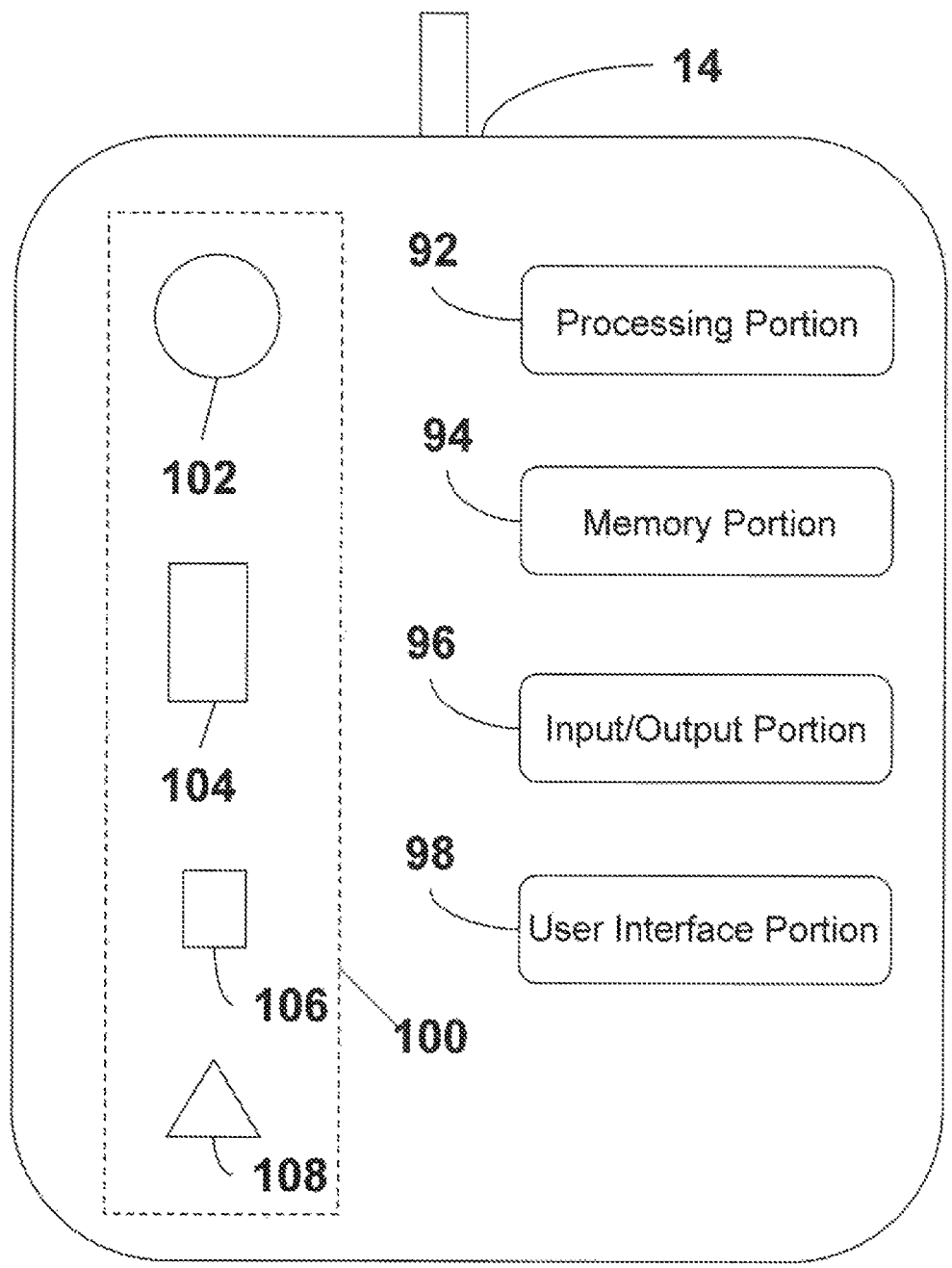
FIG. 3 is a block diagram of an example wireless communications device that is configurable to implement automatic control of update rate notifications.

FIG. 3 is a block diagram of an example wireless communications device 14 that is configurable to implement the present disclosure. The communications device 14 can include any appropriate device, mechanism, software, and/or hardware for automatically monitoring and updating the notification update rate of applications running on the wireless communications device 14. As described herein, the communications device 14 comprises hardware, or a combination of hardware and software and moreover, each portion of the communications device 14 comprises hardware, or a combination of hardware and software. In an example configuration, the communications device 14 comprises a processing portion 92, a memory portion 94, an input/output portion 96, a user interface (UI) portion 98, and a sensor portion 100 comprising at least one of a position sensor portion 102, a force/wave sensor 104, a microphone 106, a moisture sensor 108, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerometer is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 108 is capable of detecting moisture, such as detecting if the communications device 14 is submerged in a liquid. The processing portion 92, memory portion 94, input/output portion 96, user interface (UI) portion 98, video camera portion 102, force/wave sensor 104, and microphone 106 are coupled together to allow communications therebetween (coupling not shown in FIG. 3). The communications device 14 also can comprise a timer (not depicted in FIG. 3).

In various embodiments, the input/output portion 96 comprises a receiver of the communications device 14, a transmitter of the communications device 14, or a combination thereof. The input/output portion 96 is capable of receiving and/or providing information pertaining to determining if non-voice emergency services are available as described herein. The input/output portion 96 also is capable of communications with one or more application servers 22, as described herein. For example, the input/output portion 96 can include a wireless communications (e.g., 2.5 G/3 G/GPS/UMTS) SIM card. The input/output portion 96 is capable of receiving and/or sending text information, video information, audio information, control information, image information, data, or any combination thereof. Some of such data communications may be solicited by the user and some may be unsolicited by the user, that is, automatic updates to a data application running on the handset 14. In an example embodiment, the input/output portion 96 is capable of receiving and/or sending information to determine a location of the communications device 14. In an example configuration, the input/output portion 96 comprises a GPS receiver. In an example configuration, the communications device 14 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 96 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

Any of these sensors may be used by the handset 14 as factors to determine or control the automatic update rates of applications running in the handsets. The processing portion 92 is capable of determining if a data application is running on the device which receives automatic or periodic updates from an application server. For example, the processing portion 92 is capable of, in conjunction with any other portion of the communications device 14, executing an monitoring the data applications running on the mobile device 14, determining the data applications that receive updates to the mobile device, detecting the set-up of a voice call, and adjusting the time between updates based on the detecting step. Other steps may be executed by the processing portion 92 of the mobile device 14, including, but not limited to, the detecting an input by a user, detecting a call set-up request by the mobile device, detecting that the mobile device is positioned near a head of a user, detecting the quality of the channel, measuring the time between updates to the data application, detecting a signal from the data application indicating that updates may occur, detecting a signal from the data application indicating that automatic updates of the data application are enabled, lengthening the time between automatic updates, suspending updates to the data application during a voice call, and restoring the default or user generated times between updates after a voice call has terminated, or the like, or any combination thereof. The processing portion 92, in conjunction with any other portion of the communications device 14, can provide the ability for users/subscribers to enable, disable, and configure various features of an application.

In a basic configuration, the communications device 14 may include at least one memory portion 94. The memory portion 94 can store any information utilized in conjunction with determining if non-voice emergency services are available s described herein. For example, the memory portion 94 is capable of storing information pertaining to an application, a location of a communications device, subscriber profile information, subscriber identification information, phone numbers, an identification code of the communications device, video information, audio information, control information, information indicative sensor data (e.g., raw individual sensor information, combination of sensor information, processed sensor information, etc.), or a combination thereof. Depending upon the exact configuration and type of processor, the memory portion 94 can be volatile (such as some types of RAM), non-volatile (such as ROM, flash memory, etc.). The communications device 14 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 94, or a portion of the memory portion 92 is hardened such that information stored therein can be recovered if the communications device 14 is exposed to extreme heat, extreme vibration, extreme moisture, corrosive chemicals or gas, or the like. In an example configuration, the information stored in the hardened portion of the memory portion 94 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 94 intelligible.

The communications device 14 also can contain a UI portion 98 allowing a user to communicate with the communications device 14. The UI portion 98 is capable of rendering any information utilized in conjunction with the functionality as described herein. For example, the UI portion 98 can provide means for entering text, entering a phone number, rendering text, rendering images, rendering multimedia, rendering sound, rendering video, receiving sound, rendering an indication that an application with automatic updates is available and running, or the like, as described herein. The UI portion 98 can provide the ability to control the communications device 14, via, for example, buttons, soft keys, voice actuated controls, a touch screen, movement of the mobile communications device 14, visual cues (e.g., moving a hand in front of a camera on the mobile communications device 14), or the like. The UI portion 98 can provide visual information (e.g., via a display), audio information (e.g., via speaker), mechanically (e.g., via a vibrating mechanism), or a combination thereof. In various configurations, the UI portion 98 can comprise a display, a touch screen, a keyboard, a speaker, or any combination thereof. The UI portion 98 can comprise means for inputting biometric information, such as, for example, fingerprint information, retinal information, voice information, and/or facial characteristic information.

The UI portion 98 can be utilized to enter an indication of the designated destination (e.g., the phone number, IP address, or the like).

In an example embodiment, the sensor portion 100 of the communications device 14 comprises the video camera portion 102, the force/wave sensor 104, and the microphone 106. The video camera portion 102 comprises a camera (or cameras) and associated equipment capable of capturing still images and/or video and to provide the captured still images and/or video to other portions of the communications device 14. In an example embodiment, the force/wave sensor 104 comprises an accelerometer, a tilt sensor, an acoustic sensor capable of sensing acoustic energy, an optical sensor (e.g., infrared), or any combination thereof. The communications device 14 may include a memory for storing applications and a processor configured to monitor a data application running on the mobile device, determine whether the data application receives updates to the mobile device, detecting the set-up of a voice call, and adjusting the time between updates based on the detecting step. The mobile device 14 may include a background application that operates when the data application is operational. The adjusting step may include suspending the updates while a voice call is operational or lengthening the time between updates while a voice call is operational. The mobile device 14 may also be configured such that the detecting one of a user input, a call-set up process by the mobile device, and a position of the mobile device in proximity to the head of the user.

Figure 4:
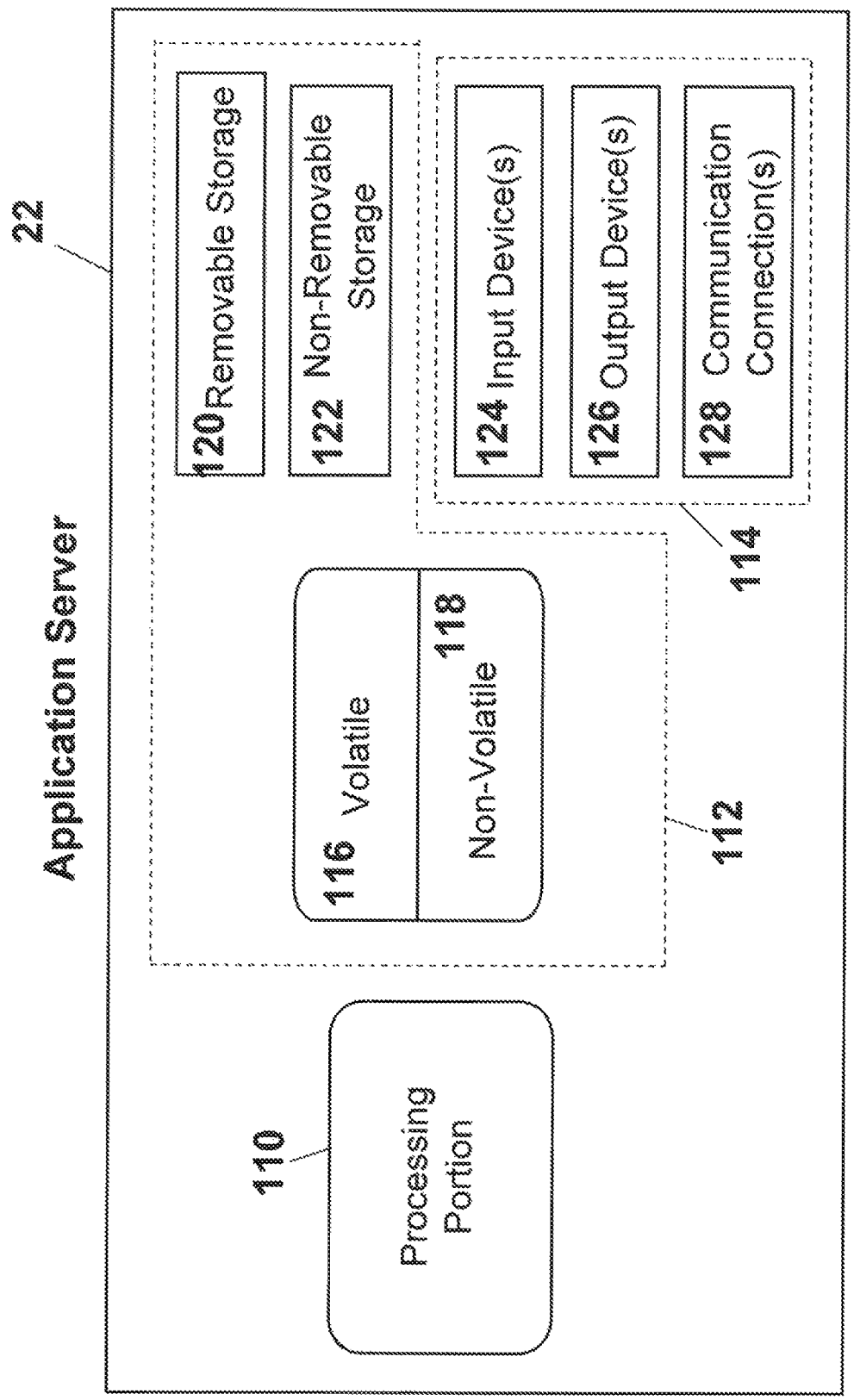
FIG. 4 is a block diagram of an example of an application server.

FIG. 4 is a block diagram of an example applications server 22. In an example embodiment, the application server 22 comprises a network entity comprising hardware, or a combination of hardware and software. And, each portion of the application message server 22 comprises hardware, or a combination of hardware and software. When used in conjunction with a network, the functionality needed to facilitate determining if non-voice emergency services are available can reside in any one or combination of application servers. The application server 22 depicted in FIG. 4 represents any appropriate network entity, apparatus, or combination of network entities or apparatuses, such as a processor, a server, a gateway, etc., or any combination thereof. It is emphasized that the block diagram depicted in FIG. 4 is exemplary and not intended to imply a specific implementation or configuration. Thus, the application server 22 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the application server 22 comprises a processing portion 110, a memory portion 112, and an input/output portion 114. The processing portion 110, memory portion 112, and input/output portion 114 are coupled together (coupling not shown in FIG. 4) to allow communications therebetween. The input/output portion 114 is capable of receiving and/or providing information from/to a device (e.g., communications device 14) and/or other application servers configured to be utilized when determining if non-voice emergency services are available.

The processing portion 110 is capable of performing functions associated with automatically pushing updates to an application running on the handset 14. For example, the processing portion 110 is capable of, in conjunction with any other portion of the application server 22 as needed, processing a request from an application running on the handset 14 to adjust the time period between automatic updates that may be pushed to the application running on the handset 14. Such adjustment may include lengthening or shortening the time between automatic updates, suspending automatic updates, or resuming automatic updates.

The memory portion 112 can store any information utilized in conjunction with controlling the application and the interaction with the application running on the handset 14, as described herein. For example, the memory portion 112 is capable of storing information pertaining to a location of a communications device 14, a location of a application server 22, a subscriber profile information, subscriber identification information, phone numbers, an identification code of the communications device, video information, audio information, control information or the like, or a combination thereof. Depending upon the exact configuration and type of application server 22, the memory portion 112 can include a computer storage medium, or media, that is volatile 116 (such as dynamic RAM), non-volatile 118 (such as ROM), or a combination thereof. The application server 22 can include additional storage, in the form of computer storage media (e.g., removable storage 120 and/or non-removable storage 122) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is an article of manufacture.

The application server 22 also can contain communications connection(s) 128 that allow the application server 22 to communicate with other devices, network entities, or the like. A communications connection(s) can comprise communication media. Communication media can be used to communicate computer readable instructions, data structures, program modules, or other data. Communication media can include an appropriate transport mechanism or information delivery media that can be used to transport a modulated data signal such as a carrier wave.

The application server 22 also can include input device(s) 124 such as keyboard, mouse, pen, voice input device, touch input device, an optical input device, etc. Output device(s) 126 such as a display, speakers, printer, mechanical vibrators, etc. also can be included.

The communications device (e.g., communications device 14) and the network entity (application server 22) can be part of and/or in communication with various wireless communications networks. Some of which are described below.

Figure 5:
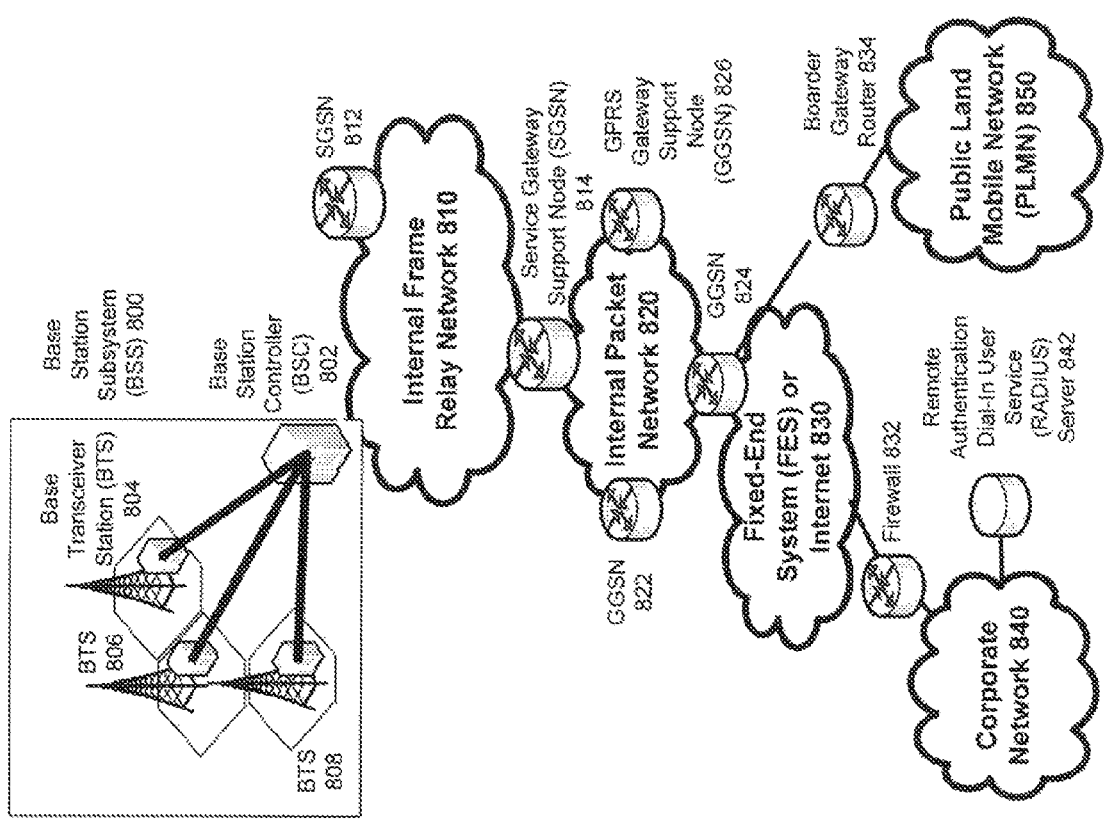
FIG. 5 depicts an overall block diagram of an exemplary packet-based mobile cellular network environment, such as a GPRS network and including a UMTS network, in which automatic control of update rate notifications may be implemented.

FIG. 5 depicts an overall block diagram of an exemplary packet-based mobile cellular network environment, such as a GPRS network, in which the present disclosure can be implemented. In the exemplary packet-based mobile cellular network environment shown in FIG. 5, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In exemplary fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 6:
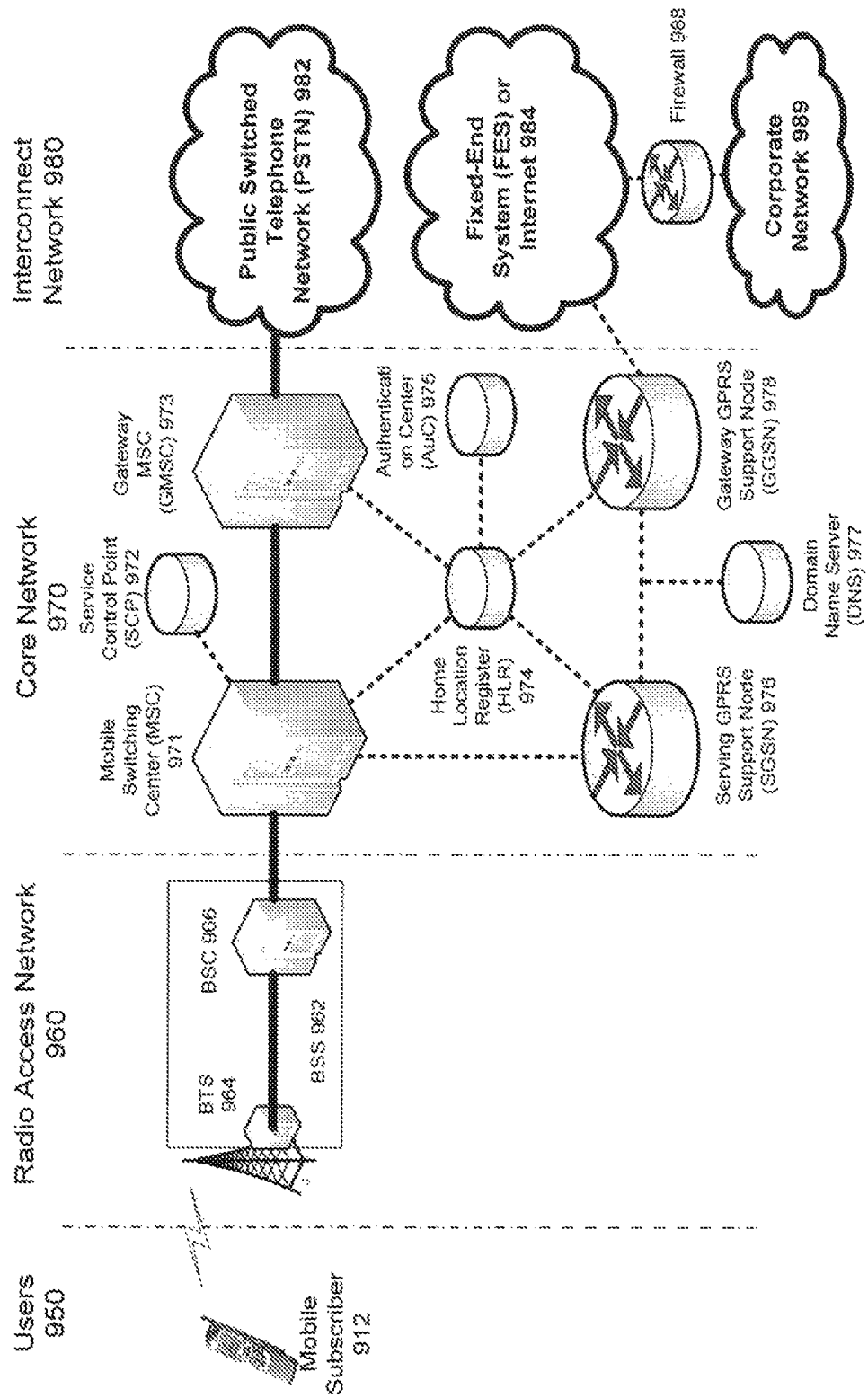
FIG. 6 illustrates an architecture of a typical GPRS network in which automatic control of update rate notifications may be implemented.

FIG. 6 illustrates an architecture of a typical GPRS network in which the present disclosure can be implemented. The architecture depicted in FIG. 6 is segmented into four groups: users 950, radio access network 960, core network 970, and interconnect network 980. Users 950 comprise a plurality of end users. Note, device 912 is referred to as a mobile subscriber in the description of network shown in FIG. 6. In an example embodiment, the device depicted as mobile subscriber 912 comprises a communications device (e.g., wireless anti-theft security communications device 14). Radio access network 960 comprises a plurality of base station subsystems such as BSSs 962, which include BTSs 964 and BSCs 966. Core network 970 comprises a host of various network elements. As illustrated in FIG. 6, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 6, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 7:
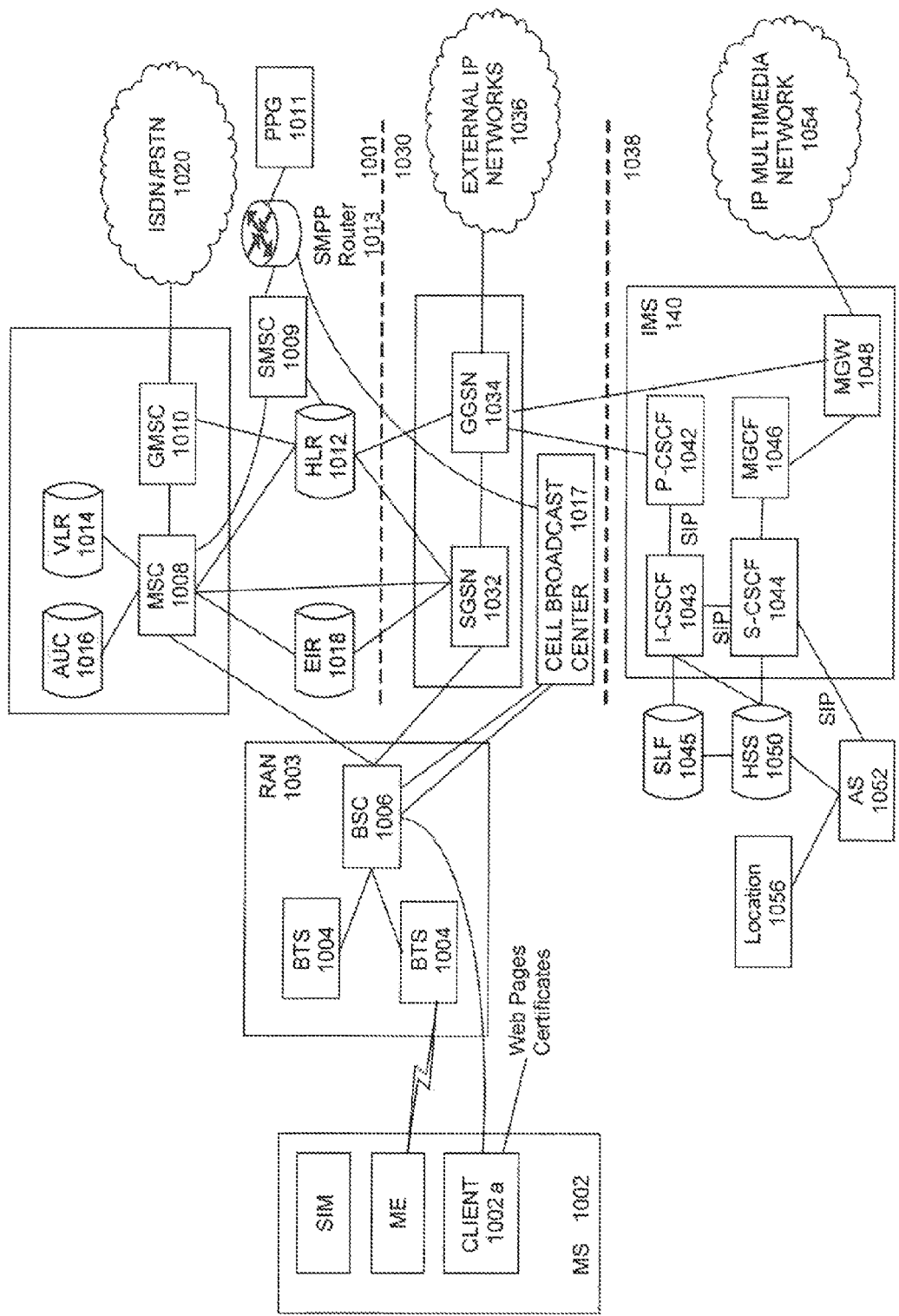
FIG. 7 illustrates an exemplary block diagram view of a GSM/GPRS/IP multimedia network architecture within which automatic control of update rate notifications can be implemented.

FIG. 7 illustrates an exemplary block diagram view of a GSM/GPRS/IP multimedia network architecture within which the present disclosure can be implemented. As illustrated, the architecture of FIG. 7 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1017 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1038 was introduced with 3GPP Release 10, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 8:
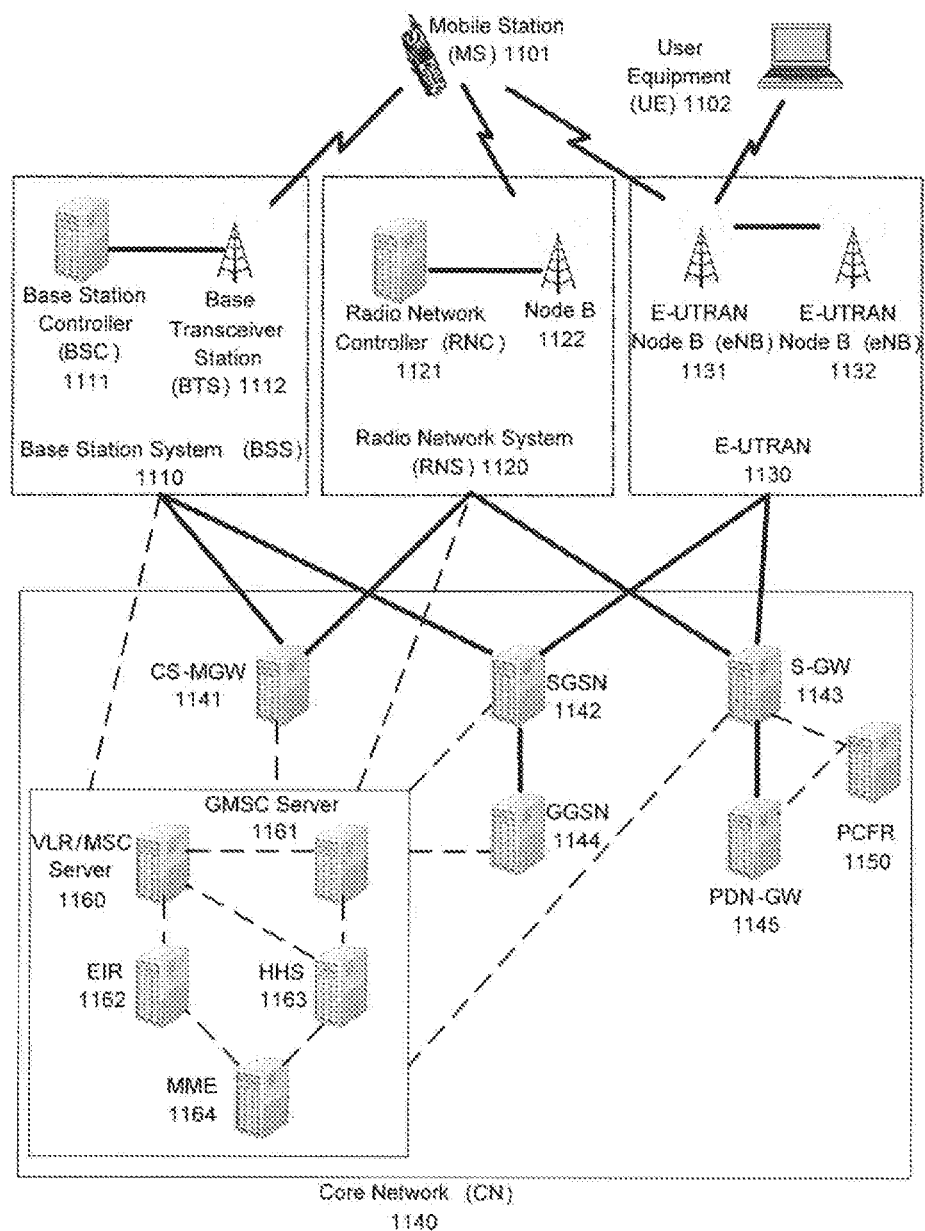
FIG. 8 illustrates a PLMN block diagram view of an exemplary architecture in which automatic control of update rate notifications may be incorporated.

FIG. 8 illustrates a PLMN block diagram view of an exemplary architecture in which the present disclosure may be incorporated. Mobile Station (MS) 1101 is the physical equipment used by the PLMN subscriber. In one illustrative embodiment, communications device 40 may serve as Mobile Station 1101. Mobile Station 1101 may be one of, but not limited to, a cellular telephone, a cellular telephone in combination with another electronic device or any other wireless mobile communication device.

Mobile Station 1101 may communicate wirelessly with Base Station System (BSS) 1110. BSS 1110 contains a Base Station Controller (BSC) 1111 and a Base Transceiver Station (BTS) 1112. BSS 1110 may include a single BSC 1111/BTS 1112 pair (Base Station) or a system of BSC/BTS pairs which are part of a larger network. BSS 1110 is responsible for communicating with Mobile Station 1101 and may support one or more cells. BSS 1110 is responsible for handling cellular traffic and signaling between Mobile Station 1101 and Core Network 1140. Typically, BSS 1110 performs functions that include, but are not limited to, digital conversion of speech channels, allocation of channels to mobile devices, paging, and transmission/reception of cellular signals.

Additionally, Mobile Station 1101 may communicate wirelessly with Radio Network System (RNS) 1120. RNS 1120 contains a Radio Network Controller (RNC) 1121 and one or more Node(s) B 1122. RNS 1120 may support one or more cells. RNS 1120 may also include one or more RNC 1121/Node B 1122 pairs or alternatively a single RNC 1121 may manage multiple Nodes B 1122. RNS 1120 is responsible for communicating with Mobile Station 1101 in its geographically defined area. RNC 1121 is responsible for controlling the Node(s) B 1122 that are connected to it and is a control element in a UMTS radio access network. RNC 1121 performs functions such as, but not limited to, load control, packet scheduling, handover control, security functions, as well as controlling Mobile Station 1101's access to the Core Network (CN) 1140.

The evolved UMTS Terrestrial Radio Access Network (E-UTRAN) 1130 is a radio access network that provides wireless data communications for Mobile Station 1101 and User Equipment 1102. E-UTRAN 1130 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1130 may include of series of logical network components such as E-UTRAN Node B (eNB) 1131 and E-UTRAN Node B (eNB) 1132. E-UTRAN 1130 may contain one or more eNBs. User Equipment 1102 may be any user device capable of connecting to E-UTRAN 1130 including, but not limited to, a personal computer, laptop, mobile device, wireless router, or other device capable of wireless connectivity to E-UTRAN 1130. The improved performance of the E-UTRAN 1130 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 11-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1101 may communicate with any or all of BSS 1110, RNS 1120, or E-UTRAN 1130. In a illustrative system, each of BSS 1110, RNS 1120, and E-UTRAN 1130 may provide Mobile Station 1101 with access to Core Network 1140. The Core Network 1140 may include of a series of devices that route data and communications between end users. Core Network 1140 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1141 is part of Core Network 1140, and interacts with Visitor Location Register (VLR) and Mobile-Services Switching Center (MSC) Server 1160 and Gateway MSC Server 1161 in order to facilitate Core Network 1140 resource control in the CS domain. Functions of CS-MGW 1141 include, but are not limited to, media conversion, bearer control, payload processing and other mobile network processing such as handover or anchoring. CS-MGW 1140 may receive connections to Mobile Station 1101 through BSS 1110, RNS 1120 or both.

Serving GPRS Support Node (SGSN) 1142 stores subscriber data regarding Mobile Station 1101 in order to facilitate network functionality. SGSN 1142 may store subscription information such as, but not limited to, the International Mobile Subscriber Identity (IMSI), temporary identities, or Packet Data Protocol (PDP) addresses. SGSN 1142 may also store location information such as, but not limited to, the Gateway GPRS Support Node (GGSN) 1144 address for each GGSN where an active PDP exists. GGSN 1144 may implement a location register function to store subscriber data it receives from SGSN 1142 such as subscription or location information.

Serving Gateway (S-GW) 1143 is an interface which provides connectivity between E-UTRAN 1130 and Core Network 1140. Functions of S-GW 1143 include, but are not limited to, packet routing, packet forwarding, transport level packet processing, event reporting to Policy and Charging Rules Function (PCRF) 1150, and mobility anchoring for inter-network mobility. PCRF 1150 uses information gathered from S-GW 1143, as well as other sources, to make applicable policy and charging decisions related to data flows, network resources and other network administration functions. Packet Data Network Gateway (PDN-GW) 1145 may provide user-to-services connectivity functionality including, but not limited to, network-wide mobility anchoring, bearer session anchoring and control, and IP address allocation for PS domain connections.

Home Subscriber Server (HSS) 1163 is a database for user information, and stores subscription data regarding Mobile Station 1101 or User Equipment 1102 for handling calls or data sessions. Networks may contain one HSS 1163 or more if additional resources are required. Exemplary data stored by HSS 1163 include, but are not limited to, user identification, numbering and addressing information, security information, or location information. HSS 1163 may also provide call or session establishment procedures in both the PS and CS domains.

The VLR/MSC Server 1160 provides user location functionality. When Mobile Station 1101 enters a new network location, it begins a registration procedure. A MSC Server for that location transfers the location information to the VLR for the area. A VLR and MSC Server may be located in the same computing environment, as is shown by VLR/MSC Server 1160, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1101 registration or procedures for handover of Mobile Station 1101 to a different section of the Core Network 1140. GMSC Server 1161 may serve as a connection to alternate GMSC Servers for other mobile stations in larger networks.

Equipment Identity Register (EIR) 1162 is a logical element which may store the International Mobile Equipment Identities (IMEI) for Mobile Station 1101. In a typical embodiment, user equipment may be classified as either "white listed" or "black listed" depending on its status in the network. In one embodiment, if Mobile Station 1101 is stolen and put to use by an unauthorized user, it may be registered as "black listed" in EIR 1162, preventing its use on the network. Mobility Management Entity (MME) 1164 is a control node which may track Mobile Station 1101 or User Equipment 1102 if the devices are idle. Additional functionality may include the ability of MME 1164 to contact an idle Mobile Station 1101 or User Equipment 1102 if retransmission of a previous session is required.

The functionality of the disclosure may be included in client software residing on the user equipment 112. In such a case, logic for performing the functions set forth above may be included and stored in a computer readable medium such as memory 114. The computer readable medium may include a memory having a physical structure and be integrated within the user equipment 112 or be implemented on a removable memory such as a memory card, memory stick, flash drive or other type of external memory. Additionally, the client software may be stored on a network and downloaded into RAM of the user equipment for use during mRAB calls.

While example embodiments of managing mRAB calls have been described in connection with various computing devices/processors, the underlying concepts can be applied to any computing device, processor, or system capable of managing mRAB calls. The various techniques described herein can be implemented in connection with hardware or software or, where appropriate, with a combination of both. Thus, the methods and apparatuses of managing mRAB calls can be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (tangible computer-readable storage medium). When the program code is loaded into and executed by a machine, such as a computer, the machine becomes an apparatus for managing mRAB calls. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for managing mRAB calls also can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for managing mRAB calls. When implemented on a general-purpose processor, the program code combines with the processor to provide a unique apparatus that operates to invoke the functionality of managing mRAB calls.

While example embodiments of automatically adjusting the update rates of data applications have been described in connection with various computing devices, the underlying concepts can be applied to any computing device or system capable of implementing predetermined emergency alert messages. The various techniques described herein can be implemented in connection with hardware or software or, where appropriate, with a combination of both. Thus, the methods and apparatus for generating, selecting, and/or implementing the present disclosure, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing predetermined emergency alert messages. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

While the present invention has been described in connection with the various embodiments of the various figures, it is to be understood that other similar embodiments can be used or modifications and additions can be made to the described embodiment for performing the same function without deviating therefrom. For example, one skilled in the art will recognize that the update of data rates in an mRAB environment as described in the present application may apply to any environment, whether wired or wireless, and may be applied to any number of such devices connected via a communications network and interacting across the network. Therefore, the method and system of defining mobile alerts should not be limited to any single embodiment, but rather should be construed in breadth and scope in accordance with the appended claims.

What is claimed:

1. A method for automatically controlling the rate of updates for data applications running on a mobile device, comprising: monitoring the data applications running on the mobile device; determining the data applications that receive updates to the mobile device; detecting the set-up of a voice call; and adjusting the time between updates of the data applications based on the detecting step.

2. The method of claim 1 wherein the detecting step comprises detecting an input by a user.

3. The method of claim 1 wherein the detecting step comprises detecting a call set-up request by the mobile device.

4. The method of claim 1 wherein the detecting step comprises detecting that the mobile device is positioned near a head of a user.

5. The method of claim 1 wherein the determining step comprises measuring the time between updates to the data application.

6. The method of claim 1 wherein the determining step comprises detecting a signal from the data application indicating that updates may occur.

7. The method of claim 1 wherein the determining step comprises detecting a signal from the data application indicating that automatic updates of the data application are enabled.

8. The method of claim 1 wherein the adjusting step comprises lengthening the time between updates.

9. The method of claim 1 wherein the adjusting step comprises suspending updates to the data application during a voice call.

10. The method of claim 1 further comprising analyzing the quality of the communications channel and the adjusting step is based on the analyzing step and the detecting step.

11. A method for automatically controlling the rate of updates for data applications running on a mobile device, comprising: monitoring the data applications running on the mobile device; determining the data applications that receive updates to the mobile device; analyzing the signal quality of the communications channel; and adjusting the time between updates of the data applications based on the analyzing step.

12. The method of claim 11 further comprising detecting a voice call and wherein the adjusting step is based upon the analyzing step and the detecting step.

13. A mobile device configured for simultaneous voice and data communication sessions, comprising: a memory for storing applications; and a processor configured: to monitor a data application running on the mobile device, to determine whether the data application receives updates to the mobile device, to detect the set-up of a voice call, to adjust the time between updates of the data applications based on the detect function.

14. The mobile device of claim 13 wherein the applications includes a background application that operates when the data application is operational.

15. The mobile device of claim 13 wherein the adjust function comprises suspending the updates while a voice call is operational.

16. The mobile device of claim 13 wherein the adjust function comprises lengthening the time between updates while a voice call is operational.

17. The mobile device of claim 13 wherein the detect function comprises detecting one of a user input, a call-set up process by the mobile device, and a position of the mobile device in proximity to the head of the user.

18. The mobile device of claim 13 wherein the processor is also configured to analyze the signal quality of the communications channel and wherein the adjust function is based on the analyze function and the detect function.

19. A mobile device configured for simultaneous voice and data communication sessions, comprising: a memory for storing applications; and a processor configured: to monitor a data application running on the mobile device, to determine whether the data application receives updates to the mobile device, to analyze the quality of a voice call, to adjust the time between updates of the data applications based on the analyze function.

20. The mobile device of claim 19 wherein the processor is further configured to detect a voice call and wherein the adjust function is based on the detect function and the analyze function.

* * * * *